United States Patent
Kauss et al.

(10) Patent No.: US 12,416,268 B2
(45) Date of Patent: Sep. 16, 2025

(54) METHOD FOR OPERATING AN INTERNAL COMBUSTION ENGINE, AND INTERNAL COMBUSTION ENGINE

(71) Applicant: Robert Bosch GmbH, Stuttgart (DE)

(72) Inventors: Holger Kauss, Wernau (DE); Gabriele Sgroi, Ostfildern (DE); Giovanni Cornetti, Weil der Stadt (DE); Horst Mueller, Sachsenheim (DE); Moritz Hoess, Bietigheim-Bissingen (DE); Samuel Weinbrenner, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/693,019

(22) PCT Filed: Sep. 2, 2022

(86) PCT No.: PCT/EP2022/074497
§ 371 (c)(1),
(2) Date: Apr. 8, 2024

(87) PCT Pub. No.: WO2023/036710
PCT Pub. Date: Mar. 16, 2023

(65) Prior Publication Data
US 2024/0392732 A1    Nov. 28, 2024

(30) Foreign Application Priority Data
Sep. 10, 2021   (DE) ................. 10 2021 210 001.5

(51) Int. Cl.
*F02D 41/00* (2006.01)
*F01N 3/20* (2006.01)
(Continued)

(52) U.S. Cl.
CPC ....... *F02D 41/0007* (2013.01); *F01N 3/2033* (2013.01); *F01N 3/36* (2013.01); *F02B 37/20* (2013.01); *F02D 41/0027* (2013.01)

(58) Field of Classification Search
CPC ...... F01N 3/36; F01N 3/2033; F02D 41/0007; F02D 41/0027; F02B 37/20
See application file for complete search history.

(56) References Cited

U.S. PATENT DOCUMENTS 11,754,023 B2 * 9/2023 Voice ............... F02M 26/35
                                                    60/605.2
2006/0053777 A1   3/2006 Bruckmann
(Continued)

FOREIGN PATENT DOCUMENTS

CA    3073699 A1 * 9/2020 ............. F02B 65/00
DE    102006037649 A1   2/2008
(Continued)

OTHER PUBLICATIONS

Machine translation of DE 102006037649 A1 (Lepperhoff) obtained from Espacenet on Sep. 17, 2024.*
International Search Report issued in PCT/EP2022/074497 on Dec. 16, 2022.

*Primary Examiner* — Ngoc T Nguyen
(74) *Attorney, Agent, or Firm* — NORTON ROSE FULBRIGHT US LLP

(57) ABSTRACT

A method for operating an internal combustion engine including a combustion chamber which is connectable to a charge air supply and to a supply for fuel. An exhaust gas system receives the combusted air from the combustion chamber and supplies it at least partially to an exhaust gas turbocharger, wherein fuel can be introduced into the exhaust gas system via a metering valve. The method includes: (i) supplying fuel and charge air to the combustion chamber, wherein more oxygen is present in the combustion (Continued)

chamber than can react with the fuel, (ii) igniting the air/gas mixture in the combustion chamber, (iii) discharging the burned-off mixture (exhaust gas) into the exhaust gas system, (iv) supplying fuel to the exhaust gas flowing from the combustion chamber, (v) igniting the fuel in the exhaust gas, and supplying the fuel to the exhaust gas turbocharger.

11 Claims, 1 Drawing Sheet

(51) Int. Cl.
 *F01N 3/36* (2006.01)
 *F02B 37/20* (2006.01)

(56) References Cited

U.S. PATENT DOCUMENTS

| | | | | |
|---|---|---|---|---|
| 2006/0283187 A1* | 12/2006 | Broadbent | ............ | F23C 3/006 |
| | | | | 60/605.1 |
| 2011/0203261 A1* | 8/2011 | Kotrba | ................ | F01N 3/2066 |
| | | | | 60/299 |
| 2013/0247884 A1 | 9/2013 | Caine | | |

FOREIGN PATENT DOCUMENTS

| | | | |
|---|---|---|---|
| DE | 102012200012 A1 | 7/2013 | |
| DE | 102017200835 A1 | 7/2018 | |
| FR | 2864161 A1 | 6/2005 | |
| FR | 2895767 A1 * | 7/2007 | ........... F01N 13/009 |
| JP | 2002021567 A | 1/2002 | |
| JP | 2008280944 A | 11/2008 | |

\* cited by examiner

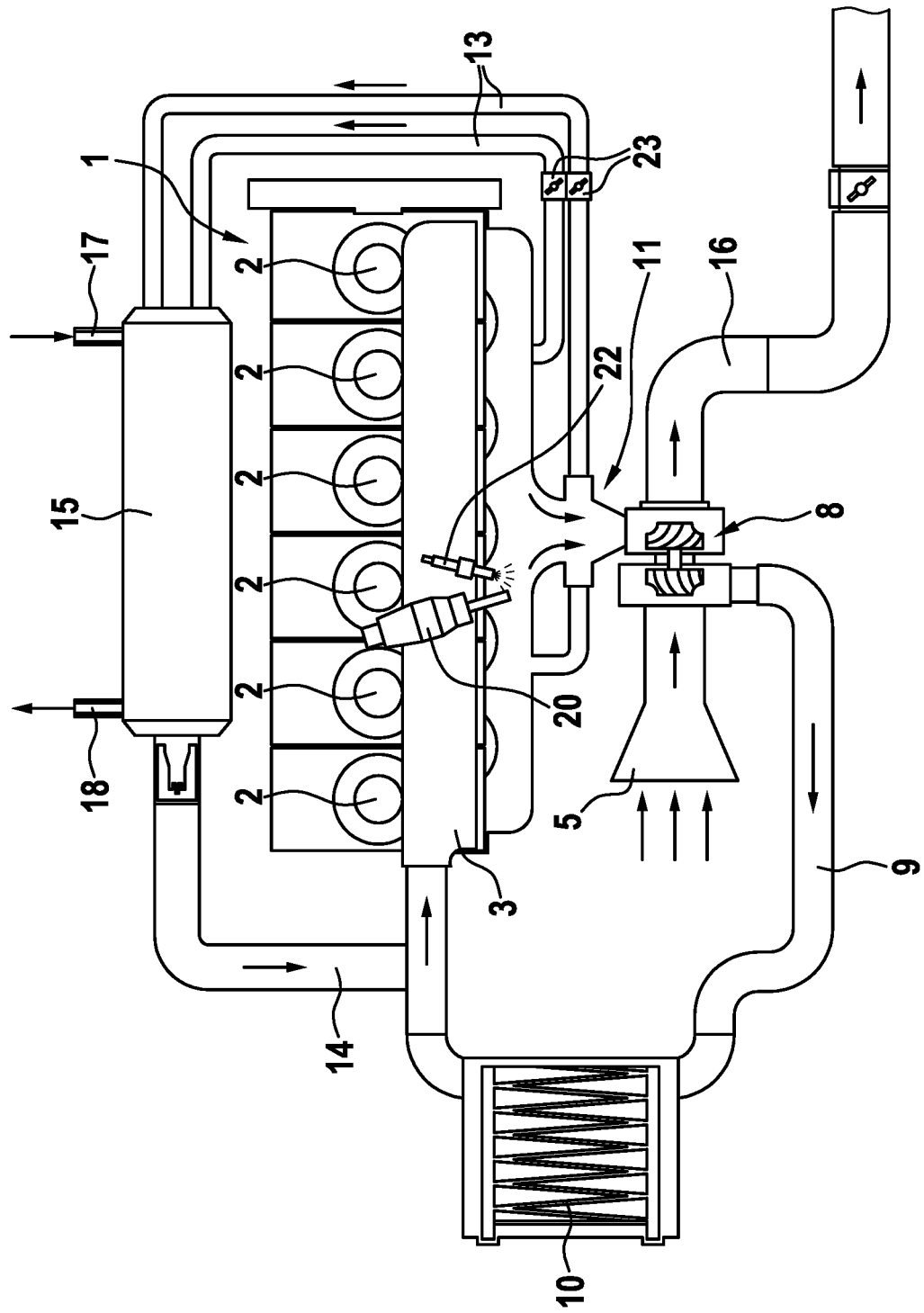

METHOD FOR OPERATING AN INTERNAL COMBUSTION ENGINE, AND INTERNAL COMBUSTION ENGINE

FIELD

The present invention relates to an internal combustion engine and to a method for operating this internal combustion engine, wherein the internal combustion engine is in particular provided for combusting gaseous fuel.

BACKGROUND INFORMATION

Internal combustion engines which have a plurality of cylinders having corresponding combustion chambers are described in the related art. Such an internal combustion engine, including attached components, is, for example, described in German Patent Application No. DE 10 2017 200 835 A1, in which the fuel is introduced either into the intake tract or directly into the combustion chambers of the internal combustion engine. In order to increase the power of the internal combustion engine, the charge air is compressed by means of an exhaust gas turbocharger. The produced exhaust gas in the combustion chamber is conducted via discharge valves into an exhaust gas system and from there into the exhaust gas turbocharger. For high power of the engine and especially for good dynamics, i.e., a rapid increase in power of the engine in the case of a corresponding demand, a rapid increase in air compression in the intake tract is required. The power of the exhaust gas turbocharger depends on the exhaust gas enthalpy, i.e., in particular on the exhaust gas temperature: the higher the temperature of the exhaust gas, the higher the possible power of the turbocharger.

In the case of a premixed combustion, i.e., when there is a time interval between the introduction of the fuel into the combustion chamber and its ignition, the following conflict of objectives occurs: in order to achieve clean combustion of the fuel/air mixture and in particular to limit nitrogen oxide emissions, the fuel, e.g., hydrogen, is combusted with a high level of excess air. This means that significantly more oxygen is present in the combustion chamber than can chemically react with the fuel present there, which corresponds to a so-called lean mixture. The mixing ratio is expressed by the value $\lambda$: if there is precisely as much oxygen as can react with the fuel, this corresponds to a $\lambda$ value of 1. A lean mixture has a value $\lambda>1$; a mixture with excess fuel (so-called rich mixture) has a value $\lambda<1$. A $\lambda$ value greater than 1 lowers the combustion temperature and reduces the formation of nitrogen oxides during combustion but also lowers the temperature of the exhaust gas, which reduces the power of the turbocharger. The consequence is poor response behavior of the engine, that is to say that the engine can only slowly increase its power in the case of a corresponding demand, and torque build-up takes place only with a delay.

SUMMARY

With the method according to the present invention for operating an internal combustion engine, in particular for gaseous fuels, and the internal combustion engine according to the present invention, it may be achieved that the internal combustion engine exhibits good response behavior despite a high level of excess air in the combustion chamber, and a rapid increase in power is thus made possible. For this purpose, according to an example embodiment of the present invention, fuel is admixed via a metering valve to the exhaust gas in the exhaust gas system between the combustion chamber and the exhaust gas turbocharger, and the resulting exhaust gas/fuel mixture in the exhaust gas system is ignited so that the exhaust gas is heated and its enthalpy is increased. The hot exhaust gas is conducted into the turbine of the turbocharger, where a correspondingly high power is available for compressing the charge air. The engine thus has a rapid response and makes a rapid increase in power possible.

On the one hand, a high level of excess air can thus be implemented in the combustion chamber, in particular in order to keep the nitrogen oxide emission low and to minimize the effort for exhaust gas aftertreatment. On the other hand, by admixing the fuel, for example hydrogen, a high exhaust gas enthalpy in the exhaust gas, and thus a good response behavior of the internal combustion engine, can be produced.

In a first advantageous embodiment of the method of the present invention, fuel is introduced into the exhaust gas only if the air compression power of the exhaust gas turbocharger is not sufficient for the power demand on the internal combustion engine. In the case of a lower or medium power demand, an additional increase in the exhaust gas enthalpy is usually not necessary in order to achieve the desired power of the internal combustion engine, and the additional fuel in the exhaust gas can be dispensed with in order not to increase the consumption unnecessarily.

According to an example embodiment of the present invention, in order to increase the exhaust gas enthalpy in accordance with the power demand, it is advantageously provided that, the higher the power demand on the internal combustion engine, the more fuel is introduced into the exhaust gas. In this respect, it should be noted that, at most, as much fuel is introduced as can react with the residual oxygen present in the exhaust gas.

The fuel in the exhaust gas system is advantageously ignited by means of an electrical ignition device arranged there, for example by means of an electrical spark plug, as is also used for igniting the air/fuel mixture in the combustion chamber. An ignition that is precise in terms of time and space and is optimally coordinated with the opening of the outlet valves of the cylinders is thus possible.

In internal combustion engines, a plurality of cylinders are generally present, and it is therefore also possible to ignite the exhaust gas/fuel mixture by means of the hot exhaust gas of one of the cylinders, which hot exhaust gas is introduced into the exhaust gas system at that moment. If these processes are coordinated with one another in terms of time and space, the exhaust gas/fuel mixture is reliably ignited without an electrical ignition device being required.

According to an example embodiment, the internal combustion engine according to the present invention for carrying out the method according to the present invention has a combustion chamber which is connectable to a charge air supply and to a metering device for the fuel. Furthermore, an exhaust gas system is present, into which the burned-off fuel/air mixture (exhaust gas) flows from the combustion chamber and is supplied to an exhaust gas turbocharger, which compresses the charge air for the internal combustion engine. A metering valve, via which fuel can be introduced into the exhaust gas, is arranged in the exhaust gas system.

In an advantageous development of the present invention, an electrical ignition device is provided in the exhaust gas system, by means of which ignition device the exhaust gas/fuel mixture can be ignited precisely in terms of time and space in order to achieve an increase in enthalpy.

In a further advantageous development of the present invention, a portion of the exhaust gas is conducted back to the charge air. The mass flow, which is conducted via the turbocharger, can be influenced thereby and the efficiency of the internal combustion engine can thus be increased.

In a further advantageous embodiment of the present invention, the temperature of the charge air compressed by the exhaust gas turbocharger is lowered by means of a charge air cooler before introduction into the combustion chamber. As a result, a greater amount of air and thus oxygen can be brought into the combustion chamber, and the power of the internal combustion engine can thus be increased.

Further advantages and advantageous embodiments of the present invention can be found in the description and the FIGURE.

BRIEF DESCRIPTION OF THE DRAWINGS

FIG. 1 shows an internal combustion engine according to an example embodiment of the present invention schematically.

DETAILED DESCRIPTION OF EXAMPLE EMBODIMENTS

An internal combustion engine according to the present invention is shown schematically in the FIGURE. The internal combustion engine 1 has a plurality of combustion chambers 2, in this exemplary embodiment six combustion chambers 2 arranged next to one another. The combustion air is supplied via an intake pipe 5 having an air filter 6, an exhaust gas turbocharger 8, and an air line 9 having a charge air cooler 10, wherein the air line 9 finally opens into an intake manifold 3. In this case, the charge air cooler 10 makes it possible to cool the charge air and thus lower the air temperature in order to be able to introduce a greater amount of air and thus also oxygen into the combustion chambers. Via the intake manifold 3, all combustion chambers 2 are supplied with the necessary charge air, which passes from the intake manifold 3 via inlet valves (not shown in the FIGURE) into the combustion chambers 2 at the right time. The supply of the fuel is not shown in more detail in the drawing and takes place, for example, directly to the combustion chambers 2 so that an ignitable fuel/air mixture results there. The fuel/air mixture is ignited in the combustion chamber 2 with the aid of an electrical ignition device, for example a spark plug.

The burned-off fuel/air mixture in the combustion chambers 2 passes as exhaust gas into an exhaust manifold 12, which is part of an exhaust gas system 11. In the process, the exhaust gas system 11 receives the exhaust gas from all combustion chambers 2 and conducts it via the exhaust gas turbocharger 8 into an exhaust pipe 16. The exhaust gas drives the exhaust gas turbocharger 8, which compresses the charge air in the air line 9. In order to increase the efficiency of the internal combustion engine, a portion of the exhaust gas is conducted back into the intake manifold 3. For this purpose, two exhaust gas recirculation lines 13 in this exemplary embodiment branch off from the exhaust manifold 12 and open into an exhaust gas recirculation cooler 15. Here, the recirculated exhaust gas is cooled in order not to further heat the charge air. Through the exhaust gas recirculation cooler 15 flows a coolant, which is supplied via a coolant inlet 17 and discharged via a coolant outlet 18. The exhaust gas cooled in this way is again supplied via the feed pipe 14 to the intake manifold 3. The need-based metering of the recirculated exhaust gas takes place via throttle valves 23 in the exhaust gas recirculation lines 13.

In order to increase the exhaust gas enthalpy, a metering valve 20, via which fuel, for example hydrogen, can be introduced into the exhaust gas, is arranged in the exhaust manifold 12. The exhaust gas/fuel mixture is ignited by means of an electrical ignition device 22 so that the exhaust gas temperature and thus its enthalpy is increased. The higher the exhaust gas enthalpy, the higher the possible power of the turbocharger 8 and thus the achievable compression of the charge air. The electrical ignition device 22 is, for example, a spark plug, as is also used for igniting the fuel/air mixture in the combustion chambers of the internal combustion engine.

For igniting the exhaust gas/fuel mixture, the use of an electrical ignition device 22 is not necessary in all cases. If the introduction of the fuel is precisely coordinated with the introduction of the hot exhaust gas from one of the combustion chambers 2, the temperature of the exhaust gas is sufficient to ignite the fuel in the exhaust manifold 12. In this case, the electrical ignition devices 22 can be omitted.

If the power of the turbocharger is sufficient for the power demand on the internal combustion engine, without an increase in the enthalpy of the exhaust gas being necessary, the metering of the fuel into the exhaust manifold can be omitted. If the power demand on the internal combustion engine increases, for example as a result of a corresponding driver request, the exhaust gas enthalpy can be increased rapidly by metering fuel by means of the metering valve 20 so that the response behavior of the internal combustion engine is significantly improved in comparison to the response behavior without enthalpy increase.

The fuel can be introduced into the exhaust gas system not only in the exhaust manifold 12 but also downstream of the exhaust manifold 12. In this case, the ignition device also has to be arranged in this region in order to ensure the ignition of the exhaust gas/fuel mixture.

The present invention can advantageously be used when hydrogen is used as gaseous fuel. However, it is also possible to use other gaseous fuels, for example natural gas. In this case, an application is possible both for vehicles from the field of passenger cars and in commercial vehicles. The method according to the present invention can also be used in stationary or other mobile applications of the corresponding internal combustion engine.

The invention claimed is:

1. A method for operating an internal combustion engine including a combustion chamber, which is connectable to a charge air supply and to a supply for fuel, and including an exhaust gas system, which receives combusted air from the combustion chamber and at least partially supplies the combusted air to an exhaust gas turbocharger, wherein fuel can be introduced into the exhaust gas system via a metering valve between the combustion chamber and the exhaust gas turbocharger, the method comprising the following steps:
    supplying charge air and fuel to the combustion chamber of the internal combustion engine, wherein more oxygen is present in the combustion chamber than is consumed during combustion;
    igniting an air/fuel mixture in the combustion chamber;
    discharging burned-off mixture including exhaust gas from the combustion chamber into the exhaust gas system;
    supplying fuel between the combustion chamber and the exhaust gas turbocharger to the exhaust gas flowing from the combustion chamber;
    igniting the fuel in the exhaust gas system; and supplying at least a portion of the exhaust gas to the exhaust gas turbocharger, wherein fuel is introduced into the exhaust gas only when an air compression power of the exhaust gas turbocharger is not sufficient for a power demand on the internal combustion engine.

2. The method according to claim 1 wherein the greater a power demand on the internal combustion engine, the greater an amount of fuel supplied to the exhaust gas.

3. The method according to claim 1, wherein the fuel is ignited using an electrical ignition device arranged in the exhaust gas system.

4. The method according to claim 1, wherein a plurality of combustion chambers are present, which supply their exhaust gas to the same exhaust gas system, and the fuel is supplied in terms of time and space such that the fuel is ignited by hot exhaust gas of one of the combustion chambers.

5. The method according to claim 1, wherein no more fuel is supplied to the exhaust gas than can be combusted with an amount of oxygen present in the exhaust gas.

6. The method according to claim 1, wherein the fuel is a gaseous fuel, the gaseous fuel including hydrogen.

7. The method according to claim 1, wherein a premixed combustion takes place in the combustion chamber.

8. An internal combustion engine, comprising:
a combustion chamber, which is connectable to a charge air supply and to a supply device for fuel;
an exhaust gas system into which exhaust gas of the combustion chamber is discharged;
an exhaust gas turbocharger into which at least a portion of the exhaust gas is conducted and which compresses the charge air; and
a metering valve, via which fuel can be introduced into the exhaust gas, arranged in the exhaust gas system between the combustion chamber and the exhaust gas turbocharger,
wherein fuel is introduced into the exhaust gas only when an air compression power of the exhaust gas turbocharger is not sufficient for a power demand on the internal combustion engine.

9. The internal combustion engine according to claim 8, wherein an electrical ignition device by means of which an exhaust gas/fuel mixture can be ignited is arranged in the exhaust gas system.

10. The internal combustion engine according to claim 8, wherein a portion of the exhaust gas is conducted back into the charge air.

11. The internal combustion engine according to claim 8, wherein a temperature of the charge air compressed by the exhaust gas turbocharger is lowered using a charge air cooler before introduction into the combustion chamber.

* * * * *